United States Patent Office 3,113,125
Patented Dec. 3, 1963

3,113,125
PREPARATION OF SYNTHETIC POLYESTERS
USING BORANE CATALYSTS
Raymond Jack Grantham, Wexford, and James W. Shepherd, Mars, Pa., assignors to Callery Chemical Company, Pittsburgh, Pa., a corporation of Pennsylvania
No Drawing. Filed Dec. 21, 1959, Ser. No. 860,658
12 Claims. (Cl. 260—75)

This invention relates to an improved method of preparing synthetic polyesters, and more particularly to the use of amine borane or phosphine borane catalysts in their preparation from a diester of a carboxylic acid and a polyhydric alcohol.

Various polyesters of dicarboxylic acids and polyhydric alcohols are well known in the art, and have been used for a variety of purposes, such as for example, in paint and varnish formulations, extrusions, castings, laminations, the production of fibers, or for modifying other polymeric materials. These polyesters have been prepared by heating together a polyhydric alcohol and a dibasic carboxylic acid or a polyester forming detrivative of a dibasic carboxylic acid. The intended use generally determines the choice of polyhydric alcohol and dibasic carboxylic acid or derivative thereof and the extend to which the polymerization is carried. A diester of a dibasic carboxylic acid and a monohydric alcohol has been a preferred polyester forming derivative in many cases. An ester interchange takes place when a diester of a dicarboxylic acid and a monohydric alcohol is heated with a polyhydric alcohol to form the diester of the polyhydric alcohol. This diester then forms the polyester by a transesterification condensation reaction, splitting out the polyhydric alcohol. The formation of the monomeric diester and polyester may be carried out either simultaneously or sequentially, the preferred method depending primarily on the particular monohydric alcohol diester and polyhydric alcohol used.

The preparation of polyesters by the ester interchange reactions are generally slow and difficult to drive to the desired degree of completion, thereby requiring severe reaction conditions and long reaction times. This results in the occurrence of deleterious side reactions, the extent of which is approximately proportionate to the reaction time, as well as the obvious disadvantage of low output of polyester per unit time for any given reactor size. Numerous catalysts have heretofore been proposed and used to promote the polyester forming reactions, but many of these only moderately increase reaction rates or produce discolored or otherwise inferior polyester product. Further, many of the proposed catalysts are effective for only one of the polyester forming reactions; for example, they may promote the ester interchange to form the monomeric polyhydric alcohol diester, but fail to promote the condensation reaction to form the polymeric esters, even though this is also an ester interchange type reaction.

It is accordingly, an object of this invention to provide an improved method of preparing synthetic polyesters by the use of a new and improved catalyst. It is another object to provide a catalyst that accelerates all reaction stages in the formation of polyesters from polyhydric alcohols and diesters of dibasic carboxylic acids. Other objects will become apparent from the following description.

This invention is based on our discovery that amine boranes and phosphine boranes are effective catalysts, either alone or in combination with metal or metal compound catalysts, greatly accelerating in all reaction stages the formation of polyesters from a polyhydric alcohol and a diester of a dibasic carboxylic acid.

Generally all the amine boranes and hydrocarbon substituted phosphine boranes and mixtures thereof are suitable for use in this invention. Tertiary amine boranes and trisubstituted phosphine boranes, such as for example the trialkylamine boranes, triarylamine boranes, and mixed alkyl aryl amine boranes, and the analogous phosphine boranes are preferred since they show greater catalytic activity than primary or secondary amine boranes or mono- or di-substituted phosphine boranes. Representative examples of suitable amine boranes include alkyl amine boranes, such as mono-, di-, and tri-, methyl, ethyl, n-propyl, iso-propyl, n-butyl, n-amyl, and octyl amine boranes; polyfunctional aliphatic amine boranes such as ethylenediamine bis(borane), diethylene triamine tris(borane), triethylene tetramine tetrakis(borane), dimethylamino propylamine bis(borane), and diethylamino propylamine bis(borane); cyclic aliphatic amines such as cyclohexylamine borane; heterocyclic amine boranes such as pyridine borane, piperidine borane, lutidine borane, picoline borane, quinoline borane, indole borane and morpholine borane; aromatic amine boranes such as aniline borane, toluidine boranes, phenylenediamine bis(borane), di- and tri-phenylamine boranes, methylene dianiline bis(borane); and mixed aliphatic-aromatic amine boranes such as dimethylbenzylamine borane, α-methylbenzyl dimethylamine borane, N-methyl phenylene diamine bis(borane), methylphenylamine borane, and ethyl phenyl amine borane.

Representative examples of suitable phosphine boranes include alkyl substituted phosphine boranes such as mono- di-, and tri-methyl, ethyl, n-propyl, iso-propyl, butyl, sec-butyl, amyl, and octyl phosphine boranes; aromatic substituted phosphine boranes such as phenyl, diphenyl, and triphenyl phosphine borane, tri-p-tolyl phosphine borane, and tri-9-phenanthryl phosphine borane; and mixed alkyl aryl substituted phosphine boranes such as methyl diphenyl phosphine borane, dimethyl phenyl phosphine borane and the like.

The new catalysts of this invention may be used in any process for preparing a polyester by reaction of a diester of a dicarboxylic acid with a polyhydric alcohol at elevated temperatures. Examples of suitable diesters of dicarboxylic acids include diesters of monohydric alcohols containing from 1 to 10 carbon atoms and aliphatic dibasic acids such as oxalic acid, malonic acid, succinic acid, glutaric acid, adipic acid, pimelic acid, suberic acid, dimethylmalonic acid, diglycolic acid, β-oxydipropionic acid, γ-oxydibutyric acid, fumaric acid, itaconic acid, and the like; and diesters of monohydric alcohols containing from 1 to 10 carbon atoms and aromatic acids such as phthalic acid, isophthalic acid, terephthalic acid and the like. Examples of suitable polyhydric alcohols include polymethylene glycols, such as ethylene glycol, 1,3-propylene glycol, 1,4-butylene glycol, 1,6-hexylene glycol, 1,10-decamethylene glycol and the like, other dihydric alcohols such as xylylene glycols and cyclohexane dimethanol, and alcohols containing 3 or more hydroxy radicals such as glycerol, sorbitol, pentaerythritol, 1,2,4-trihydroxybutane and the like.

The catalysts are especially valuable for the preparation of high melting linear polyesters of aromatic dicarboxylic acids and methylene glycols, such as for example the glycol terephthalates, which are capable of being drawn into fibers. The new catalysts minimize side reactions which tend to degrade the polyesters at the relatively high temperatures used. And by decreasing the time required to accomplish the polymerization, the time available for the occurrence of degradation reaction is also reduced, thus minimizing the amount of color formation and other deleterious reactions.

The new catalysts may also be used to advantage in combination with metal or metal compound transesterification catalysts which have heretofore been employed. Such prior known catalysts include for example, alkali metals, alkaline earth metals, cobalt, iron, nickel, antimony, and compounds of these metals such as oxides, hydroxides, inorganic acid salts such as halides and borates, and salts of organic acids such as formates, acetates, stearates and the like. The term metal catalysts as used herein refers to metal and metal compound transesterification catalysts. When used in combination the reaction proceeds at a faster rate than when either the metal catalyst or the new borane catalyst is used alone.

It is preferred to use between about 0.2% and 3.0% of amine borane or phosphine borane catalyst based on the weight of the reactant diester of dibasic carboxylic acid. More or less catalyst may be employed if desired with no adverse effect on the formation of the polyester; however, the use of larger amounts imparts no substantial additional benefit. The use of less than about 0.2% catalyst gives only marginal benefits but as little as 0.01% shows catalytic activity. The new catalysts are effective in the same amount whether used alone or used in combination with metal catalysts. When used in combination, the amount of metal catalyst may be less or the same as that used when the particular metal catalyst is used alone. Preferably, the smallest effective amount of metal catalyst is used; when high proportions of metal catalyst are used the undesirable characteristics of the metal catalyst, for example, discoloration, are not entirely overcome, even though the reaction rate is increased.

The following examples are illustrative of the effectiveness of the new catalysts for the preparation of polyesters.

*Example I*

A group of reactions were performed in which 9.7 g. of dimethyl terephthalate, 5.6 g. of ethylene glycol, and the desired catalyst were charged to a closed glass reaction vessel equipped with an overhead vapor discharge condenser tube and a nitrogen inlet tube. The reaction mixture was heated at a constant heat input for a time sufficient to bring the reaction mixture to about 300° C. to complete the formation of the high molecular weight polyester. The reactant mixture was agitated by a nitrogen stream passing through the melt, which also functioned as a carrier gas to facilitate removal of the volatile alcohol reaction products. Methanol vapor, the by-product of the transesterfication reaction to produce ethylene glycol terephthalate, is first evolved at a reaction temperature of about 140–200° C.; ethylene glycol, produced by condensation polymerization reaction, is then removed overhead at the higher temperatures. The results of these reactions using about 1% catalyst based on the weight of diester are set forth in the following table:

| Catalyst | Required Reaction Time (Hr.: min.) | Polyester Color [1] | Melting Point |
|---|---|---|---|
| None | 33:27 | 3 | 244 |
| Trimethylamine Borane | 3:58 | 1 | 228 |
| Methyl dihydrogenated Tallow Amine Borane [2] | 3:01 | 2 | 210 |
| Triethylene-diamine bisborane | 2:20 | 3 | 190 |
| Tributylphosphine borane | 2:50 | 2 | 242 |
| Triphenylphosphine borane | 4:07 | 2 | 226 |

[1] Note color designations used throughout this application are as follows: 1, white; 2, off white; 3, pale yellow brown; 4, medium yellow brown and darker.
[2] Approximately 3% used.

The use of amine borane or phosphine borane catalysts greatly accelerates the formation of the polyester and gives a polyester of superior quality with no or essentially no discoloration.

*Example II*

Another group of reactions was performed in the same manner as in Example I, in which trimethylamine borane catalyst was used in varying amounts. The glycol terephthalate polyesters produced in each case were white, and the required reaction time and polyester melting points were as follows:

| Reaction | Percent Trimethylamine Borane | Reaction Time | Polyester Melting Point |
|---|---|---|---|
| 1 | 0.1 | 13:03 | 176 |
| 2 | 0.5 | 4:05 | 225 |
| 2a | 0.5 | 5:40 | 245 |
| 3 | 1.0 | 3:58 | 228 |

In these and other reactions it was determined that less than about 0.2% catalyst, based on the amount of diester of dibasic carboxylic acid, gave only moderate improvement in the rate of polyester formation, and required quite long reaction time to obtain high molecular weight products. With larger amounts the reactions were greatly accelerated, and rapidly produced high molecular weight high melting polyesters. In reaction 2a the reaction product of reaction 2 was maintained at about 270–300° C. for an addition period thereby forming even higher melting materials.

*Example III*

The new catalysts are particularly effective when used in combination with metals or metal compounds which are by themselves transesterification catalysts. This is illustrated by the following reactions of dimethyl terephthalate and ethylene glycol performed in the same manner as in the previous examples.

| Catalyst (wt. percent) | | Reaction Time, Hr.: Min. | Polyester Color | Polyester Melting Point (° C.) |
|---|---|---|---|---|
| Trimethylamine Borane | Magnesium | | | |
| 0 | 0.7 | 5:06 | 2 | 237 |
| 0.5 | 0.1 | 4:53 | 3 | 246 |
| 0.5 | 0.01 | 3:16 | 2 | 249 |
| 0.5 | 0.0015 | 3:55 | 1 | 224 |

The combination catalysts are effective when the metal catalyst is used in only very minute amounts, as little as 0.001%, resulting in a greatly accelerated reaction producing a polyester of good color and high melting point. When high proportions of the metal catalyst are used, e.g. more than about 20% of the amount of borane catalyst used, the reaction rate is increased, however, the produced polyester is off color to about the same degree as when the metal catalyst is used alone. Other metal catalysts may be used in combination with the amine boranes and phosphine boranes with substantially the same effect.

The basic method of forming polyesters is to heat together at a high enough temperature to form a melt of the diester of the dibasic carboxylic and monohydric alcohol with the polyhydric alcohol. A number of variations of this basic process have heretofore been used in the preparation of polyesters, e.g. the ester exchange to form monomeric diester of the polyhydric alcohol and the dibasic acid may be carried out at atmospheric pressure, and the condensation reaction may then be carried out under vacuum; or the reactions may be carried out in solution in inert organic solvents; or other methods and variations may be used. The amine borane and phosphine borane catalysts, alone or in combination with metal catalysts, are equally effective in all the variant methods used for the formation of polyesters by transesterification and condensation polymerization reactions.

According to the provisions of the patent statutes, we have explained the principle and mode of practicing our invention, have described what we now consider to be its best embodiments. However, we desire to have it understood that, within the scope of the appended claims, the invention may be practiced otherwise than as specifically described.

We claim:

1. In a process for producing polymeric polyesters by heating and reacting a polyhydric alcohol with a diester of a dibasic carboxylic acid selected from the group consisting of aliphatic and aromatic dibasic carboxylic acid and a monohydric alcohol containing between 1 and 10 carbon atoms, the improvement which comprises heating said reactants in the presence of at least about 0.01% based on the weight of said diester of a catalyst selected from the class consisting of alkyl amine boranes, polyfunctional aliphatic amine boranes, cyclic aliphatic amine boranes, heterocyclic amine boranes, aromatic amine boranes, aliphatic-aromatic amine boranes, alkyl substituted phosphine boranes, aromatic substituted phosphine boranes, alkyl-aryl substituted phosphine boranes and mixtures thereof.

2. A method according to claim 1 in which the catalyst is used in an amount between about 0.2% and 3.0% based on the diester of the dibasic carboxylic acid.

3. A method according to claim 1 in which the catalyst is a tertiary amine borane.

4. A method according to claim 1 in which the catalyst is a trialkyl amine borane.

5. A method according to claim 4 in which the catalyst is trimethylamine borane.

6. A method according to claim 1 in which the catalyst is a trialkylphosphine borane.

7. A method according to claim 6 in which the catalyst is tributyl phosphine borane.

8. In a process for producing polymeric polyesters by heating and reacting a polyhydric alcohol with a diester of a dibasic carboxylic acid selected from the group consisting of aliphatic and aromatic dibasic carboxylic acids and a monohydric alcohol containing from 1 to 10 carbon atoms, the improvement which comprises heating said reactants in the presence of a catalyst comprising (1) a transesterification catalyst selected from the group consisting of metal and metal compounds and (2) at least about 0.01% based on the weight of said diester of a compound selected from the group consisting of alkyl amine boranes, polyfunctional aliphatic amine boranes, cyclic aliphatic amine boranes, heterocyclic amine boranes, aromatic amine boranes, aliphatic-aromatic amine boranes, alkyl substituted phosphine boranes, aromatic substituted phosphine boranes, alkyl-aryl substituted phosphine boranes and mixtures thereof.

9. A method according to claim 8 in which the amount of catalyst (1) does not exceed about 20% of the amount of catalyst (2).

10. A method according to claim 8 in which catalyst (2) is a tertiary amine borane.

11. A method according to claim 10 in which catalyst (2) is trimethylamine borane.

12. In a process for producing polyethylene terephthalate wherein a polymethylene glycol is reacted at elevated temperatures with a diester of terephthalic acid and a monohydric alcohol, and the resultant glycol terephthalate is polymerized, the improvement which comprises carrying out the said reactions in the presence of at least about 0.01% based on the weight of said diester of a catalyst selected from the group consisting of alkyl amine boranes, polyfunctional aliphatic amine boranes, cyclic aliphatic amine boranes, heterocyclic amine boranes, aromatic amine boranes, aliphatic aromatic amine boranes, alkyl substituted phosphine boranes, aromatic substituted phosphine boranes, alkyl-aryl substituted phosphine boranes and mixtures thereof.

References Cited in the file of this patent

UNITED STATES PATENTS

| | | |
|---|---|---|
| 2,197,855 | Ellis | Apr. 23, 1940 |
| 2,437,232 | Rothrock | Mar. 2, 1948 |
| 2,465,319 | Whinfield | Mar. 22, 1949 |
| 2,973,337 | Stroh | Feb. 28, 1961 |

FOREIGN PATENTS

| | | |
|---|---|---|
| 727,729 | Great Britain | Apr. 6, 1955 |